(12) United States Patent
Takami et al.

(10) Patent No.: US 8,691,417 B2
(45) Date of Patent: Apr. 8, 2014

(54) SECONDARY BATTERY, BATTERY PACK AND CAR

(75) Inventors: Norio Takami, Yokohama (JP); Hiroki Inagaki, Kawasaki (JP); Takashi Kuboki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 21 days.

(21) Appl. No.: 13/463,249

(22) Filed: May 3, 2012

(65) Prior Publication Data

US 2012/0214044 A1     Aug. 23, 2012

Related U.S. Application Data

(63) Continuation of application No. 12/212,257, filed on Sep. 17, 2008, now Pat. No. 8,192,859.

(30) Foreign Application Priority Data

Sep. 26, 2007 (JP) .................................. 2007-249504

(51) Int. Cl.
*H01M 2/14* (2006.01)
(52) U.S. Cl.
USPC .......................................... 429/129; 429/130
(58) Field of Classification Search
USPC ....................................................... 429/149
See application file for complete search history.

(56) References Cited

U.S. PATENT DOCUMENTS

| | | | |
|---|---|---|---|
| 7,112,389 B1 * | 9/2006 | Arora et al. | 429/128 |
| 7,833,664 B2 | 11/2010 | Fujita et al. | |
| 2002/0094481 A1 * | 7/2002 | Goto et al. | 429/218.1 |
| 2004/0038124 A1 * | 2/2004 | Hisamitsu et al. | 429/161 |
| 2004/0197659 A1 * | 10/2004 | Kumar et al. | 429/231.3 |
| 2006/0024569 A1 * | 2/2006 | Hennige et al. | 429/144 |
| 2007/0231702 A1 | 10/2007 | Fujita et al. | |
| 2009/0061292 A1 | 3/2009 | Inagaki et al. | |
| 2009/0081534 A1 | 3/2009 | Takami et al. | |
| 2009/0081551 A1 | 3/2009 | Hoshina et al. | |

FOREIGN PATENT DOCUMENTS

| | | |
|---|---|---|
| JP | 5-74437 | 3/1993 |
| JP | 11-329395 | 11/1999 |
| JP | 2001-143702 | 5/2001 |
| JP | 2002-42889 | 2/2002 |
| JP | 2002-266281 | 9/2002 |
| JP | 2005-293950 | 10/2005 |
| JP | 2006-049797 | 2/2006 |

(Continued)

OTHER PUBLICATIONS

Pankaj Arora, et al., "Battery Separators", Chem. Rev. vol. 104, No. 10, Oct. 13, 2004, pp. 4419-4462.

*Primary Examiner* — Ula C Ruddock
*Assistant Examiner* — Jacob Marks
(74) *Attorney, Agent, or Firm* — Oblon, Spivak, McClelland, Maier & Neustadt, L.L.P.

(57) ABSTRACT

A secondary battery includes a positive electrode, a negative electrode containing a metal compound having a lithium ion absorption potential of 0.2V (vs. $Li/Li^+$) or more, a separator and a nonaqueous electrolyte. The separator is provided between the positive electrode and the negative electrode. The separator comprises cellulose fibers and pores having a specific surface area of 5 to 15 $m^2/g$. The separator has a porosity of 55 to 80%, and a pore diameter distribution having a first peak in a pore diameter range of 0.2 μm (inclusive) to 2 μm (exclusive) and a second peak in a pore diameter range of 2 to 30 μm.

18 Claims, 3 Drawing Sheets

(56) References Cited

FOREIGN PATENT DOCUMENTS

| JP | 2006-253081 | 9/2006 |
| JP | 2007-173447 | 7/2007 |
| JP | 2007-227090 | 9/2007 |

* cited by examiner

SECONDARY BATTERY, BATTERY PACK AND CAR

CROSS-REFERENCE TO RELATED APPLICATIONS

This application is a continuation application of prior U.S. application Ser. No. 12/212,257, filed Sep. 17, 2008, the disclosure of which is incorporated herein by reference in its entirety. The parent application claims the benefit of priority from prior Japanese Patent Application No. 2007-249504, filed Sep. 26, 2007, the entire contents of which are incorporated herein by reference.

BACKGROUND OF THE INVENTION

1. Field of the Invention

The present invention relates to a secondary battery, a battery pack using the secondary battery and a car using the secondary battery or the battery pack.

2. Description of the Related Art

Nonaqueous electrolyte batteries using a lithium metal, lithium alloy, lithium compound or carbonaceous materials as the negative electrode active material are expected as high energy density batteries and earnest studies are being made as to these nonaqueous electrolyte batteries. Lithium ion batteries comprising a positive electrode containing $LiCoO_2$ or $LiMn_2O_4$ as an active material and a negative electrode containing a carbonaceous material that absorbs and release lithium ions have been widely put to practical use in portable telephones so far.

In the case of mounting a battery in vehicles or electric trains, on the other hand, materials superior in chemical or electrochemical stability, strength and corrosion resistance are desired as the structural materials of the positive electrode or negative electrode from the viewpoint of storage characteristics at a high temperature (60° C. or more), cycle performance and long term reliability of high output. Moreover, high battery performance is required even in cold districts, which means that it is demanded of the battery to have high-output performance and long-life performance at a temperature as low as about −40° C. In the meantime, a nonvolatile and inflammable electrolytic solution is developed from the viewpoint of improving the safety required for a nonaqueous electrolyte. However, this is accompanied by reductions in output performance, low-temperature performance and long-life performance and therefore, such an electrolytic solution has not been put to practical use.

Therefore, from the foregoing descriptions, lithium ion batteries have large problems concerning high-temperature durability and low-temperature output characteristics to mount them in vehicles and the like. Particularly, it is difficult to mount and use this lithium ion battery in the engine compartment of a car as a substitute for lead-acid batteries.

Various attempts have been made to improve negative electrode characteristics. JP-A 2002-42889 (KOKAI) discloses that a negative electrode having a structure in which a current collector made from aluminum or an aluminum alloy is made to carry a specified metal, alloy or compound is used in a nonaqueous electrolyte secondary battery.

On the other hand, JP-A 2001-143702 (KOKAI) discloses that primary particles of lithium titanate compound represented by the formula $Li_aTi_{3-a}O_4$ (0<a<3) and having an average particle diameter less than 1 μm are coagulated into granules having an average particle diameter of 5 to 100 μm to form secondary particles, which are used as a negative electrode active material. Also, in JP-A 2001-143702 (KOKAI), there is the description that the coagulation of secondary particles is suppressed by the use of this negative electrode active material, which increases the production yield of a negative electrode having a large area for a large scale battery.

A remarkable attention is focused on lithium iron phosphate ($Li_xFePO_4$) which is a lithium phosphorus compound having an olivine crystal structure as a positive electrode active material to improve the performance of the positive electrode and this lithium iron phosphate is expected to improve thermal stability under high-temperature conditions. On the other hand, studies are made to attain low-temperature performance and high-temperature life performance by improving a nonaqueous electrolyte.

However, JP-A 11-329395 (KOKAI) discloses that pores of a macroporous matrix are impregnated with a solution containing a microporous polymer and the resulting macroporous matrix is used as a separator. In the separator disclosed in JP-A 11-329395 (KOKAI), a macroporous of the macroporous matrix is used to support the microporous polymer and has almost no function to support the electrolytic solution. Therefore, the separator described in JP-A 11-329395 (KOKAI) is inferior in the ability of impregnating with the electrolytic solution.

On the other hand, in JP-A 5-74437 (KOKAI), there is the description that a porous film in which a uniform porous coating made of a material having a low hydrogen overvoltage is formed on at least one surface thereof by deposition is used as separator. There is also the description that the surface area of the porous film before the porous coating is formed by deposition is at least 10 $m^2/g$ and the average pore diameter of the porous film is about 200 to about 10,000 Å. The separator described in JP-A 5-74437 (KOKAI) uses metal such as nickel as the material having a low hydrogen overvoltage and therefore not only develops short circuits but also is inferior in the ability of impregnating with an electrolytic solution.

BRIEF SUMMARY OF THE INVENTION

According to a first aspect of the present invention, there is provided a secondary battery comprising:

a positive electrode;

a negative electrode containing a metal compound having a lithium ion absorption potential of 0.2V (vs. $Li/Li^+$) or more;

a separator which is provided between the positive electrode and the negative electrode, comprises cellulose fibers and pores having a specific surface area of 5 to 15 $m^2/g$, and has a porosity of 55 to 80% and a pore diameter distribution having a first peak in a pore diameter range of 0.2 μm (inclusive) to 2 μm (exclusive) and a second peak in a pore diameter range of 2 to 30 μm; and a nonaqueous electrolyte.

According to a second aspect of the present invention, there is provided a battery pack comprises a secondary battery, the secondary battery comprising:

a positive electrode;

a negative electrode containing a metal compound having a lithium ion absorption potential of 0.2V (vs. $Li/Li^+$) or more;

a separator which is provided between the positive electrode and the negative electrode, comprises cellulose fibers and pores having a specific surface area of 5 to 15 $m^2/g$, and has a porosity of 55 to 80% and a pore diameter distribution having a first peak in a pore diameter range of 0.2 μm (inclusive) to 2 μm (exclusive) and a second peak in a pore diameter range of 2 to 30 μm; and a nonaqueous electrolyte.

According to a third aspect of the present invention, there is provided a car comprises a secondary battery, the secondary battery comprising:

a positive electrode;

a negative electrode containing a metal compound having a lithium ion absorption potential of 0.2V (vs. Li/Li$^+$) or more;

a separator which is provided between the positive electrode and the negative electrode, comprises cellulose fibers and pores having a specific surface area of 5 to 15 m$^2$/g, and has a porosity of 55 to 80% and a pore diameter distribution having a first peak in a pore diameter range of 0.2 μm (inclusive) to 2 μm (exclusive) and a second peak in a pore diameter range of 2 to 30 μm; and a nonaqueous electrolyte.

DETAILED DESCRIPTION OF THE INVENTION

First Embodiment

Figure 1:
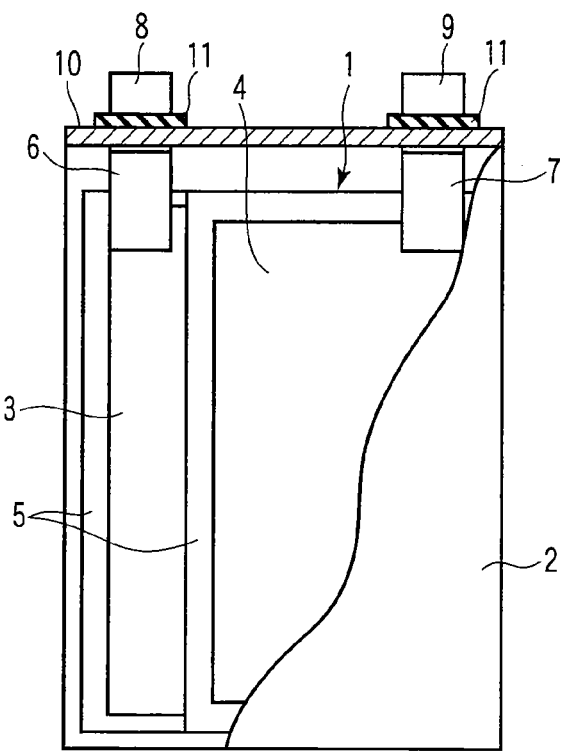
FIG. 1 is a partially broken sectional view showing a rectangular type secondary battery according to a first embodiment.

The inventors have found that when a separator containing cellulose fibers satisfies the following requirements (A) to (C), it has high-temperature durability enough to mount a secondary battery and a battery pack comprising the secondary battery in a vehicle and is, at the same time, superior in output performance at temperatures from room temperatures to high temperatures and low-temperature output performance.

(A) The porosity of the separator is 55 to 80%.

(B) The separator comprises pores having a specific surface area of 5 to 15 m$^2$/g.

(C) The separator has a pore diameter distribution having a first peak at a pore diameter of 0.2 μm (inclusive) to 2 μm (exclusive) and a second peak at a pore diameter of 2 to 30 μm.

When a secondary battery or a battery pack is mounted in a vehicle or electric train, it is subjected to a temperature as high as 100° C. or more depending on where it is placed. For this, a polyolefin separator which is frequently used will be unusable because the resistance of the battery is remarkably increased by the thermal shrinkage of the separator. Because the separator containing cellulose fibers has high heat resistance and therefore suppresses thermal shrinkage at a high temperature of 60° C., or more. Also, if a material containing a metal compound having a lithium ion absorption potential of 0.2V (vs. Li/Li$^+$) or more is used as negative electrode, reduction decomposition of the nonaqueous electrolyte is limited at the high temperature and also, the precipitation of a metal lithium on the separator is suppressed even after a high-temperature cycle or when the battery is overcharged. Moreover, when the battery is stored for a long period of time in a charged state, when the battery is charged by continuous constant voltage charging called float charging or when the battery is overcharged, the reaction between the negative electrode and the separator can be limited. In addition to the reduction in products of a side reaction, the separator satisfying the above requirements (A) to (C) can limit the occurrence of the phenomenon that the porosity is reduced by the accumulation of products of a side reaction.

Moreover, the inventors have made it clear that gas generated by the electrodeposition of water adsorbed to the separator in the production process of the battery causes a deterioration in high-temperature storage performance and high-temperature life performance. Also, the inventors have found that when a separator containing cellulose fibers satisfies the foregoing requirements (A) to (C), the amount of water to be adsorbed to the separator can be reduced. Because, from the above results, a rise in the internal resistance of the battery and expansion (swelling) of the battery at the high temperature are reduced, a secondary battery or a battery pack can be arranged in the engine compartment of a car, that is, in the same place as in the case of the lead-acid battery. As a result, the battery according to this embodiment ensures that a battery having an outstandingly longer life, smaller-size and lighter-weight than the lead-acid battery can be attained.

Also, the inventors have found that the separator satisfying the above requirements (A) to (C) and containing cellulose fibers is rapidly impregnated even with a nonaqueous electrolyte having high viscosity such as an ionic liquid, a rise in the internal resistance of the battery in a long term charge-discharge cycle can be limited and high output performance can be accomplished at temperatures from low temperatures to high temperatures.

This embodiment enables the use of cellulose fibers that are scarcely used conventionally as the separator for secondary batteries because of the problems concerning a deterioration in life, reliability and safety.

Hereinafter, the separator, positive electrode, negative electrode and nonaqueous electrolyte will be explained.

1) Separator

The separator is a porous body containing cellulose fibers. Examples of the porous body may include nonwoven fabrics, films or paper. Also, the porous body can be made substantially of cellulose fibers. Specifically, the ratio of the cellulose fibers in the porous body is desirably 10 to 100% by weight. This can improve the heat resistance of the separator. Though the porous body may contain other types of fibers such as polyolefin fibers, but the ratio of other types of fibers is desirably 90% by weight or less (including 0% by weight) so as not to damage the heat resistance.

It is preferable that the fiber diameter of the cellulose fibers be 10 μm or less. This improves the affinity of the nonaqueous electrolyte to the separator and therefore, the resistance of the battery can be reduced. The fiber diameter of the cellulose fibers is more preferably 3 μm or less.

The reason why the porosity of the separator is limited to the above range will be explained. The separator having a porosity less than 55% is deteriorated in the impregnation with the nonaqueous electrolyte and therefore, brings about a deterioration in the output performance and low-temperature output performance of a secondary battery. Also, the accumulation of the aforementioned products of side reactions causes a more reduction in porosity, giving rise to a reduction in output performance along with its use. On the other hand, when the porosity exceeds 80%, the strength of the separator is inferior. The porosity is preferably in the range of 62 to 80%.

The distribution of pore diameter will be explained. When no peak is present at a pore diameter ranging from 0.2 μm (inclusive) to 2 μm (exclusive) even if the porosity is in the above range, the separator is deteriorated in the impregnation with the nonaqueous electrolyte, leading to a reduction in output performance or low-temperature output performance. When no peak is present at a pore diameter ranging from 2 μm to 30 μm, the amount of water adsorbed to the separator is increased, leading to a deterioration in high-temperature storage performance. In more preferable distribution of pore diameter, a first peak is present at a pore diameter ranging from 0.3 μm (inclusive) to 2 μm (exclusive) and a second peak is present at a pore diameter ranging from 3 μm to 20 μm.

The reason why the pore specific surface area of the separator is defined in the above range will be explained. When the pore specific surface area is less than 5 $m^2/g$, the ratio of pores having a diameter range of 0.2 μm (inclusive) to 2 μm (exclusive) is low and therefore, the nonaqueous electrolyte impregnation ability is deteriorated even if the first peak is present, leading to a reduction in output performance and low-temperature output performance. When the pore specific surface area exceeds 15 $m^2/g$, the ratio of pores having a diameter of 2 to 30 μm is low and therefore, the amount of water to be adsorbed to the separator is increased even if the second peak is present, leading to a reduction in high-temperature storage performance. The pore specific surface area is more preferably in the range of 10 $m^2/g$ to 14 $m^2/g$.

The separator preferably has a thickness of 20 to 100 μm and a density of 0.2 to 0.9 $g/cm^3$. When the thickness and the density are in the above ranges respectively, the balance between the mechanical strength and a reduction in the resistance of the battery can be adjusted, making it possible to provide a battery which has high output and is resistant to the development of internal short circuits. Also, a reduction in thermal shrinkage at high temperatures and high-temperature storage performance can be attained.

The separator used in this embodiment may be obtained in the following manner. Specifically, a separator having a pore diameter distribution provided with a first and second peaks and a porosity ranging of 55 to 80% is interposed between the positive electrode and the negative electrode, these parts are coiled spirally and the resulting coiled body is subjected to a high-temperature and high-pressure press operated at a temperature of 100° C. or more under a pressure of 20 $kg/cm^2$ or more. Specifically, the above high-temperature and high-pressure press can reduce the pore specific surface area ranging of 5 to 15 $m^2/g$ while keeping the porosity and pore diameter distribution within the above range. In order to prevent insulation defects, the upper limit of the pressure of the press is preferably designed to be 1000 $kg/cm^2$.

2) Positive Electrode

This positive electrode comprises a positive electrode current collector and a positive electrode layer which is carried on one or both surfaces of the current collector and contains an active material, a conductive agent and a binder.

Examples of the positive electrode active material include various oxides and sulfides. Specific examples of the positive electrode active material include manganese dioxide such as $MnO_2$, iron oxide, copper oxide, nickel oxide, lithium-manganese composite oxide, lithium-nickel composite oxide such as $Li_xNiO_2$ (⅓≤x≤½), lithium-cobalt composite oxide such as $Li_xCoO_2$ (⅓≤x≤½), lithium-nickel-cobalt composite oxide, lithium-manganese-cobalt composite oxide, lithium-manganese-nickel composite oxide, spinel type lithium-manganese-nickel composite oxide such as $Li_xMn_{2-y}Ni_yO_4$ (⅓≤x≤½, 0≤y≤0.5), metal-phosphorous oxide having an olivine structure, iron sulfate such as $Fe_2(SO_4)_3$ and vanadium oxide such as $V_2O_5$.

Examples of the lithium-nickel-cobalt composite oxide include $LiNi_{1-y-z}Co_yM_zO_2$ (M represents at least one element selected from the group consisting of Al, Cr and Fe, 0≤y≤0.5, 0≤z≤0.1).

Examples of the lithium-manganese-cobalt composite oxide include $LiMn_{1-y-z}Co_yM_zO_2$ (M represents at least one element selected from the group consisting of Al, Cr and Fe, 0≤y≤0.5, 0≤z≤0.1).

Examples of the lithium-manganese-nickel composite oxide include $LiMn_xNi_xM_{1-2x}O_2$ (M represents at least one element selected from the group consisting of Co, Cr, Al and Fe, ⅓≤x≤½). Specific examples of $LiMn_xNi_xM_{1-2x}O_2$ include $LiMn_{1/3}Ni_{1/3}Co_{1/3}O_2$ and $LiMn_{1/2}Ni_{1/2}Co_{1/2}O_2$.

Also, examples of the positive electrode active material also include organic materials and inorganic materials. The organic materials include conductive polymer materials such as a polyaniline and polypyrrole, disulfide type polymer materials. The inorganic materials include sulfur (S) and carbon fluoride. The above x, y and z whose preferable ranges are not described are preferably in the range of 0 to 1. The number of types of positive electrode active materials may be designed to be one or two or more.

Particularly preferable examples of the positive electrode active material may include metal-phosphorous oxide having an olivine structure and manganese composite oxide having a spinel structure. This is because these positive electrode active materials have the high effect of suppressing the oxidation decomposition of the separator.

Examples of the metal-phosphorous oxide having an olivine structure may include $Li_aM_bPO_4$ (M represents at least one transition metal element selected from the group consisting of Mn, Ni, Co and Fe, 0≤a≤1.1, 0.8≤b≤1.1) and $Li_aFe_{1-c}Mn_cPO_4$ (0≤a≤1.1, 0≤c≤1). Also, examples of the manganese composite oxide having a spinel structure may include $Li_aMn_2O_4$ (0≤a≤1).

In particular, iron phosphate represented by $Li_aFePO_4$ (0≤a≤1.1) is preferable. The above iron phosphate limits the growth of a film formed on the surface of the positive electrode when the battery is stored at high temperatures and therefore, a rise in the resistance of the positive electrode during storage is decreased. As a result, the storage performance of the battery at high temperatures is significantly improved and the high-temperature life performance is outstandingly improved. If a negative electrode containing a lithium-titanium oxide is used when the iron phosphate is used, the reaction between the electrode and the nonaqueous electrolyte at high temperatures is limited, leading to a small rise in the resistance at the boundary of the electrode during high-temperature storage.

The particle diameter of primary particles of the positive electrode active material is preferably 1 μm or less and more preferably 0.01 to 0.5 μm. When the particle diameter is in this range, the influences of electronic conducive resistance and the diffusion resistance of lithium ions in the active material are decreased and therefore, the output performance is improved. Also, these primary particles may be coagulated to form secondary particles having a diameter of 10 μm or less.

Carbon particles having an average particle diameter of 0.5 μm or less are preferably stuck to the surface of the positive electrode active material. The amount of these carbon particles to be stuck is preferably 0.001 to 3% by weight based on the weight of the positive electrode active material. When the amount of the carbon particles to be stuck is 0.001% by weight or more, a rise in the resistance of the positive electrode can be limited. Also, when the amount of the carbon particles to be stuck is 3% by weight or less, a rise in the resistance at the boundary between the positive electrode and the nonaqueous electrolyte can be suppressed. As a result, the output performance can be improved.

Examples of the conductive agent include acetylene black, carbon black, graphite and carbon fibers. Particularly, carbon fibers formed by a vapor phase growth method and having a fiber diameter of 1 μm or less are preferable. The use of this carbon fibers ensures that an electronic conductive network inside of the positive electrode is improved so that the electronic conductive resistance of the positive electrode is reduced, whereby the output performance of the positive electrode can be improved.

Examples of the binder include a polytetrafluoroethylene (PTFE), polyvinylidene fluoride (PVdF) and fluoro rubber.

As to the ratio of the active material, conductive agent and binder of the positive electrode to be compounded, it is preferable that the positive electrode active material be 80 to 95% by weight, the conductive agent be 3 to 19% by weight and the binder be 1 to 7% by weight.

As the current collector, an aluminum foil or aluminum alloy foil is preferable and the thickness of the current collector is preferably 20 μm or less and more preferably 15 μm or less. The lower limit of the thickness is preferably designed to be 5 μm.

The positive electrode is manufactured, for example, by suspending the positive electrode active material, conductive agent and binder in a proper solvent and this suspension is applied to the current collector, followed by drying and pressing. The specific surface area of the positive electrode layer using the BET method is measured in the same manner as in the case of the negative electrode and is preferably in the range of 0.1 to 2 $m^2/g$.

The positive electrode layer faces the negative electrode layer with the separator interposed therebetween, and the edge part of the positive electrode layer preferably is projected from the edge part of the negative electrode layer. With this structure, the potential of the positive electrode layer of the positive electrode edge part can be made to be equal to that of the positive electrode layer facing the negative electrode layer in the center of the positive electrode, whereby the positive electrode active material at the edge part can be prevented from reacting with the nonaqueous electrolyte when the battery is overcharged. When the edge part of the negative electrode layer is projected over the edge part of the positive electrode layer on the contrary, the negative electrode active material in the edge part remains unreacted. However, the positive electrode potential at the edge part is affected by the negative electrode potential of the unreacted edge part. As a result, the positive electrode potential at the edge part reaches an overcharge potential when the battery is fully charged, and there is therefore the possibility of deteriorated life performance. Therefore, it is desirable to coil the positive electrode layer and the negative electrode layer in such a manner that the area of the positive electrode layer is larger than that of the negative electrode layer and the positive electrode layer is projected over the negative electrode layer in the condition that both layers are facing each other, to thereby constitute an electrode group.

The ratio (Sp/Sn) of the area (Sp) of the positive electrode layer to the area (Sn) of the negative electrode layer is preferably in the range of 0.85 to 0.999 and more preferably in the range of 0.95 to 0.99. When the ratio is made to be in the above range, the amount of gas generated from the negative electrode can be decreased when the battery is stored at high temperatures in a charged state and when the battery is float-charged (continuous constant voltage charged) at high temperatures and it is therefore possible to improve the storage performance. When the ratio is less than 0.85, there is a fear that the capacity of the battery is decreased. Also, at this time, the ratio (Lp/Ln) of the width (Lp) of the positive electrode to the width (Ln) of the negative electrode is preferably in the range of 0.9 to 0.99.

3) Negative Electrode

This negative electrode comprises a negative electrode current collector and a negative electrode layer which is carried on one or both surface of the current collector and contains an active material, a conductive agent and a binder.

As the negative electrode material, a metal compound having a lithium ion absorption potential of 0.2V (vs. Li/Li$^+$) or more is used. The reason why the lithium ion absorption potential is defined in the above range will be explained. Examples of the active material that absorbs lithium ions at a potential less than 0.2V (vs. Li/Li$^+$) include carbonaceous materials and lithium metal. A negative electrode containing an active material that absorbs lithium ions at a potential less than 0.2V (vs. Li/Li$^+$) undergoes a reduction decomposition with a nonaqueous electrolyte at high temperatures and also, precipitates metal lithium in a long term cycle. For this, in the separator according to this embodiment, internal short circuits are easily developed. As a result, not only the output performance and charge-discharge cycle performance but also the entire battery performance is deteriorated. The lithium ion absorption potential is more preferably 0.4V (vs. Li/Li$^+$) or more and the upper limit of the lithium ion absorption potential is preferably 3V (vs. Li/Li$^+$) and more preferably 2V (vs. Li/Li$^+$).

The negative electrode active material of a metal compound capable of absorbing lithium ions at a potential range of 0.2 to 3V (vs. Li/Li$^+$) is preferably a metal oxide, metal sulfide or metal nitride.

Examples of the metal oxide include $Li_xTiO_2$ (0≤x, more preferably 0≤x≤1), a titanium type oxide, lithium-titanium oxide, tungsten oxide (for example, $WO_3$), amorphous tin oxide (for example, $SnB_{0.4}P_{0.6}O_{3.1}$), tin-silicon oxide (for example, $SnSiO_3$) and silicon oxide (SiO).

Examples of the titanium type oxide include $TiO_2$. As the crystal structure of $TiO_2$, an anatase type or B (bronze) type is preferable and titanium type oxides which are heat-treated at 300 to 600° C. and have less crystallinity are preferable. Other examples of the titanium type oxide may include composite oxides containing Ti and at least one element selected from the group consisting of P, V, Sn, Cu, Ni, Mn and Fe. Examples of the composite oxides may include $TiO_2$—$P_2O_5$, $TiO_2$—$V_2O_5$, $TiO_2$—$P_2O_5$—$SnO_2$ and $TiO_2$—$P_2O_5$-MeO (Me is at least one element selected from the group consisting of Cu, Ni and Fe). The above composite oxides preferably have less crystallinity and preferably have a microstructure in which a crystal phase and an amorphous phase coexist or an amorphous phase exists independently. Such a microstructure may improve cycle performance.

Examples of the lithium-titanium oxide may include $Li_xTiO_2$ (0≤x, more preferably 0≤x≤1), those having a spinel structure (for example, $Li_{4+x}Ti_5O_{12}$ (−1≤x≤3)), those having a rhamsdelite structure (for example, $Li_{2+x}Ti_3O_7$ (−1≤x≤3), $Li_{1+x}Ti_2O_4$ (0≤x, more preferably 0≤x≤1), $Li_{1.07+x}Ti_{1.86}O_4$ (0≤x, more preferably 0≤x≤1) and $Li_{1.07+x}Ti_{1.86}O_4$ (0≤x, more preferably 0≤x≤1). More preferable examples of the lithium-titanium oxide may include $Li_xTiO_2$ (0≤x, more preferably 0≤x≤1), those having a spinel structure and those having a rhamsdelite structure. Among these compounds, having a rhamsdelite structure, $Li_{1.1+x}Ti_{1.8}O_4$ (0≤x, more preferably 0≤x≤1) is preferable.

Examples of the metal sulfide include titanium sulfide (for example, $TiS_2$), molybdenum sulfide (for example, $MoS_2$), iron sulfide (for example, FeS, $FeS_2$ and $Li_xFeS_2$).

Examples of the metal nitride include lithium-cobalt nitride (for example, $Li_xCo_yN$, $0<x<4$, $0<y<0.5$).

The average particle diameter of primary particles of the negative electrode active material is preferably in the range of 0.001 to 1 μm. Also, the particle shape may be any shape including a granular shape and fiber shape to obtain a good performance. When the particle has a fiber shape, the fiber diameter is preferably 0.1 μm or less.

The average particle diameter of the negative electrode active material is preferably 1 μm or less and the specific surface area of the negative electrode active material is in the range of 3 to 200 $m^2/g$ when measured by the BET method using $N_2$ adsorption. This structure allows the negative electrode to have stronger affinity to the nonaqueous electrolyte.

The specific surface area of the negative electrode may be designed to be in the range of 3 to 50 $m^2/g$. The specific surface area is more preferably in the range of 5 to 50 $m^2/g$.

The porosity of the negative electrode excluding the current collector is preferably in the range of 20 to 50%. This ensures the production of a negative electrode having high affinity to the nonaqueous electrolyte and a high density. The porosity is more preferably 25 to 40%.

The negative electrode current collector is preferably made of an aluminum foil or aluminum alloy foil. When this aluminum foil or aluminum alloy foil is used for the negative electrode current collector, a deterioration during storage caused by overdischarge at high temperatures can be prevented.

The thickness of the aluminum foil or aluminum alloy foil is preferably 20 μm or less and more preferably 15 μm or less. The lower limit of the thickness is preferably designed to be 5 μm. The purity of the aluminum foil is preferably 99.99 wt % or more. As the aluminum alloy, alloys containing magnesium, zinc or silicon are preferable. On the other hand, the content of transition metals such as iron, copper, nickel and chromium is preferably 100 wt-ppm or less.

Examples of the conductive agent may include acetylene black, carbon black, cokes, carbon fibers, graphite, metal compound powder and metal powder. More preferable examples of the conductive agent include cokes which are heat-treated at 800 to 2000° C. and have an average particle diameter of 10 μm or less, graphite, TiO, TiC, TiN and metal powders such as Al, Ni, Cu and Fe.

Examples of the binder include a polytetrafluoroethylene (PTFE), polyvinylidene fluoride (PVdF), fluoro rubber, styrene-butadiene rubber and core-shell binder.

As to the ratio of the active material, conductive agent and binder of the negative electrode, it is preferable that the negative electrode active material is 80 to 95% by weight, the conductive agent is 1 to 18% by weight and the binder is 2 to 7% by weight.

The negative electrode is manufactured by suspending the aforementioned negative electrode active material, conductive agent and binder in a proper solvent and this suspension is applied to the current collector, drying and heat pressing.

4) Nonaqueous Electrolyte

Examples of the nonaqueous electrolyte include a liquid organic electrolyte prepared by dissolving an electrolyte in an organic solvent, gel-like organic electrolyte obtained by making a composite of an organic solvent and a polymer material and solid nonaqueous electrolyte obtained by making a composite of a lithium salt electrolyte and a polymer material. Also, an ionic liquid (ionic molten material) containing lithium ion may be used as the nonaqueous electrolyte.

Examples of the polymer material may include a polyvinylidene fluoride (PVdF), polyacrylonitrile (PAN) and polyethylene oxide (PEO).

Particularly, it is preferable to use an organic electrolyte having a boiling point of 200° C. or more or an ionic liquid. The organic electrolyte having a boiling point of 200° C. or more or ionic liquid are reduced in vapor pressure and in the generation of gas and therefore, excellent durability and life performance can be obtained in a high temperature environment at 80° C. or more when a secondary battery is used in vehicles or the like.

The liquid organic electrolyte is prepared by dissolving an electrolyte in a concentration of 0.5 to 2.5 mol/L in an organic solvent.

Examples of the electrolyte include $LiBF_4$, $LiPF_6$, $LiAsF_6$, $LiClO_4$, $LiCF_3SO_3$, $LiN(CF_3SO_2)_2$, $LiN(C_2F_5SO_2)_2$, $Li(CF_3SO_2)_3C$ and $LiB[(OCO)_2]_2$. The number of types of electrolyte to be used can be one or two or more. Among these compounds, a compound containing lithium tetrafluoroborate ($LiBF_4$) is preferable. This improves the chemical stability of the organic solvent and the resistance of the film on the negative electrode can be reduced, resulting in a significant improvement in low-temperature performance and cycle life performance.

Examples of the organic solvent may include cyclic carbonates such as propylene carbonate (PC) and ethylene carbonate (EC), chain carbonates such as diethyl carbonate (DEC) and dimethyl carbonate (DMC) and methyl ethyl carbonate (MEC), chain ethers such as dimethoxyethane (DME) and diethoethane (DEE), cyclic ethers such as tetrahydrofuran (THF) and dioxolan (DOX), γ-butyrolactone (GBL), acetonitrile (AN) and sulfolane (SL). These organic solvents may be used either singly or in combinations of two or more. If, for example, propylene carbonate (PC), ethylene carbonate (EC) or γ-butyrolactone (GBL) is used as a primary component, this is preferable because the boiling point is 200° C. or more and the solvent has high thermal stability. In the case of containing γ-butyrolactone (GBL), the output performance at low temperatures is improved, which is desirable. Also, because a high-concentration lithium salt can be used, the concentration of the lithium salt in the organic solvent can be in the range of 1.5 to 2.5 mol/L. When the concentration of the lithium salt is made to be 1.5 mol/L or more, a drop in lithium ion concentration at the boundary between the positive electrode and the nonaqueous electrolyte during the course of discharging under a large current can be reduced. Also, when the concentration of lithium salt is made to be 2.5 mol/L or less, a rise in the viscosity of the nonaqueous electrolyte can be limited and therefore, the transfer speed of lithium ions can be improved. Accordingly, high output can be achieved even at low temperatures.

The electrolyte containing an ionic liquid will be explained.

The ionic liquid means a salt in which at least a part thereof exhibits a liquid state at normal temperature. Here, the normal temperature means a temperature range in which a power source works in usual. The temperature range in which a power source usually works means that the upper limit of the temperature is about 120° C. (about 60° C. depending on the case) and the lower limit is about −40° C. (−20° C. depending on the case). Particularly, the temperature range of −20 to 60° C. is appropriate.

As the ionic liquid containing lithium ions, an ionic liquid containing lithium ions, an organic cation and an anion is preferably used. Also, this ionic liquid is preferably in a liquid state at the ambient temperature or lower.

Examples of the above organic cation include alkylimidazolium ions and quaternary ammonium ions having a skeleton represented by the following formula (1).

Chemical formula (1)

[Formula 1]

As the above alkylimidazolium ion, a dialkylimidazolium ion, a trialkylimidazolium ion and a tetraalkylimidazolium ion and the like are preferable. As the dialkylimidazolium ion, 1-methyl-3-ethylimidazolium ion (MEI$^+$) is preferable. As the trialkylimidazolium ion, 1,2-diethyl-3-propylimidazolium ion (DMPI$^+$) is preferable. As the tetraalkylimidazolium ion, 1,2-diethyl-3,4(5)-dimethylimidazolium ion is preferable.

As the above quaternary ammonium ion, a tetraalkylammonium ion, a cyclic ammonium ion and the like are preferable. As the tetraalkylammonium ion, dimethylethylmethoxyethylammonium ion, dimethylethylmethoxymethylammonium ion, dimethylethylethoxyethylammonium ion and trimethylpropylammonium ion are preferable.

When the above alkylimidazolium ion or a quaternary ammonium ion (especially, a tetraalkylammonium ion) is used, the melting point is preferably 100° C. or less and more preferably 20° C. or less. Also, the reactivity with the negative electrode can be reduced.

The concentration of the above lithium ion is preferably 20 mol % or less. The concentration is more preferably in the range of 1 mol % to 10 mol %. When the concentration is made to be in the above range, an ionic liquid can stability exist at a temperature as low as 20° C. or less. Also, the viscosity can be lowered at temperatures equal to or lower than normal temperature and the ion conductivity can be heightened.

The above anion preferably is one or more anions selected from the group of, for example, $BF_4^-$, $PF_6^-$, $AsF_6^-$, $ClO_4^-$, $CF_3SO_3^-$, $CF_3COO^-$, $CH_3COO^-$, $CO_3^{2-}$, $(FSO_2)_2N^-$, $N(CF_3SO_2)_2^-$, $N(C_2F_5SO_2)_2^-$ and $(CF_3SO_2)_3C^-$. The coexistence with plural anions makes it possible to form an ionic liquid having a melting point of 20° C. or less. More preferable examples of the anion include $BF_4^-$, $(FSO_2)_2N^-$, $CF_3SO_3^-$, $CF_3COO^-$, $CH_3COO^-$, $CO_3^{2-}$, $N(CF_3SO_2)_2^-$, $N(C_2F_5SO_2)_2^-$ and $(CF_3SO_2)_3C^-$. An ionic liquid having a melting point of 0° C. or less is formed more easily by these anions.

5) Container

As the container that receives the positive electrode, negative electrode and nonaqueous electrolyte, a metal container or a laminate film container may be used.

As the metal container, a metallic can which is made of aluminum, an aluminum alloy, iron or stainless and has a rectangular or cylindrical shape may be used. The plate thickness of the container is preferably 0.5 mm or less and more preferably 0.3 mm or less.

Examples of the laminate film may include a multilayer film obtained by coating an aluminum foil with a resin film. As the resin, polymers such as a polypropylene (PP), polyethylene (PE), nylon, polyethylene terephthalate (PET) may be used. Also, the thickness of the laminate film is preferably 0.2 mm or less and also, the purity of the aluminum foil is preferably 99.5% or more.

The metallic can made of an aluminum alloy is preferably constituted of an alloy containing an element such as manganese, magnesium, zinc and silicon and having an aluminum purity of 99.8% or less. An outstanding increase in the strength of the metallic can made of an aluminum alloy offers possibility of a reduction in the wall thickness of the can. As a result, a thin, light-weight and high-output battery superior in heat radiation ability can be attained.

Figure 2:
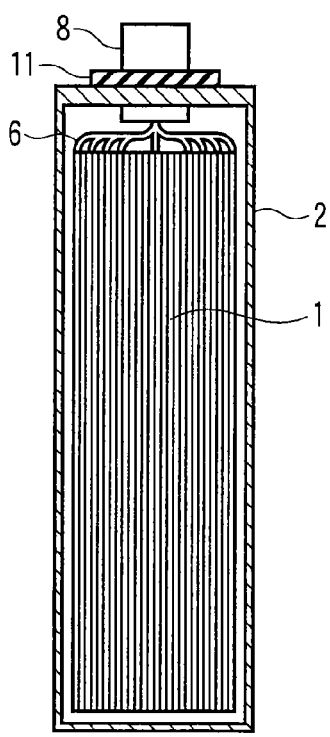
FIG. 2 is a side view of a secondary battery shown in FIG. 1.

A rectangular type secondary battery according to this embodiment is shown in FIGS. 1 and 2. As shown in FIG. 1, an electrode group 1 is received in a rectangular cylindrical metal container 2. The electrode group 1 has a structure in which a positive electrode 3 and a negative electrode 4 are coiled spirally with a separator 5 interposed therebetween into a flat form. The nonaqueous electrolyte (not shown) is supported by the electrode group 1. As shown in FIG. 2, band-shaped positive electrode leads 6 are each connected electrically to plural points of the positive electrode 3 positioned at the end surface of the electrode group 1. Also, band-shaped negative electrode leads 7 are each connected electrically to plural points of the negative electrode 4 positioned at the end surface of the electrode group 1. These plural positive electrode leads 6 are electrically connected to a positive electrode electroconductive tab (p-tab) 8 in a bundled state. A positive electrode terminal is constituted of the positive electrode lead 6 and the p-tab 8. The negative electrode leads 7 are electrically connected to a negative electrode electroconductive tab (n-tab) 9 in a bundled state. A negative electrode terminal is constituted of the negative electrode lead 7 and the n-tab 9. A metal seal plate 10 is secured to an opening part of the metal container 2 by welding. The p-tab 8 and the n-tab 9 are respectively drawn externally from drawing hole formed in the seal plate 10. The inside peripheral surface of each drawing hole of the seal plate 10 is coated with an insulation member 11 to avoid short circuits developed by the contact with the p-tab 8 and with the n-tab 9.

Second Embodiment

A battery pack according to a second embodiment comprises a battery assembly comprising the secondary batteries according to the first embodiment. Though these secondary batteries may be connected in series or in parallel, it is particularly preferable that these secondary batteries be connected in series and n units (n is 1 or more) each constituted of six secondary batteries be connected in series. A metal-phosphorous oxide having an olivine structure (for example, iron phosphate represented by $Li_aFePO_4$ ($0 \leq a \leq 1.1$)) is used as the positive electrode active material and also, $Li_xTiO_2$ ($0 \leq x$, more preferably $0 \leq x \leq 1$) or a lithium-titanium oxide having a rhamsdelite structure is used as the negative electrode active material, whereby the average voltage of the battery is 2V. In this case, when the number of batteries is made to be n times (n is 1 or more) the number of series of six batteries, the voltage of one unit constituted of 6 batteries connected in series is 12V, which is very improved in exchangeability for a lead-acid battery pack. When $Li_xTiO_2$ ($0 \leq x$, more preferably $0 \leq x \leq 1$) or a lithium-titanium oxide having a rhamsdelite structure is used as the negative electrode active material, the voltage curve can be made to have a moderate gradient and therefore, the charged condition of the battery can be easily seen only by monitoring the voltage in the same manner as in the case of a lead-acid battery. As a result, in the battery pack comprising n units each constituted of 6 batteries connected in series, the influence of a dispersion between batteries is decreased, making it possible to control the battery pack only by monitoring the voltage.

Figure 3:
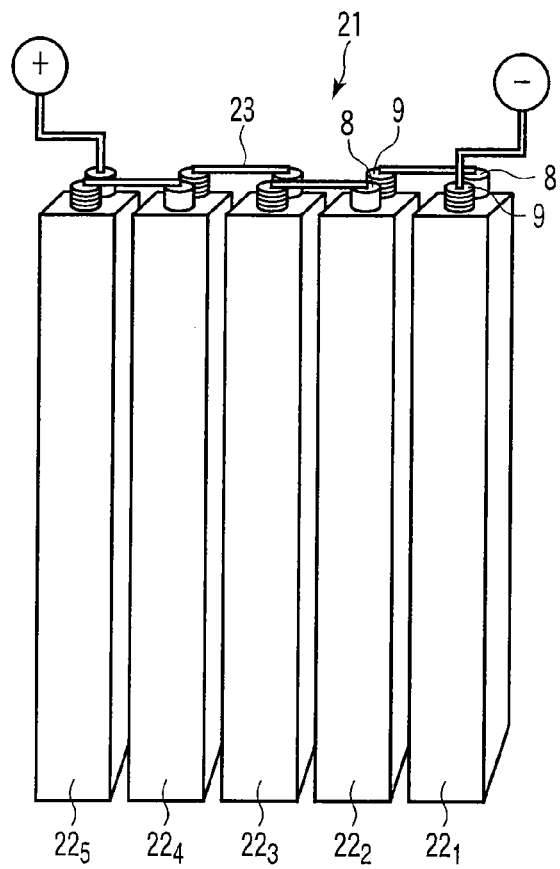
FIG. 3 is a perspective view showing a battery module according to a second embodiment.

An embodiment of a battery assembly to be used in the battery pack is shown in FIG. 3. A battery assembly 21 shown in FIG. 3 comprises plurality of rectangular secondary batteries $22_1$ to $22_5$ according to the first embodiment. The p-tab 8 of the secondary battery $22_1$ is electrically connected with the n-tab 9 of the secondary battery $22_2$ disposed adjacent to the secondary battery $22_1$ by a lead 23. Also, the p-tab 8 of the secondary battery $22_2$ is electrically connected with the n-tab 9 of the secondary battery $22_3$ disposed adjacent to the secondary battery $22_2$ by a lead 23. The secondary batteries $22_1$ to $22_5$ are connected in series in this manner.

The present invention will be explained by way of examples, which are, however, not intended to be limiting of the invention.

Example 1

As the positive electrode active material, $LiFePO_4$ particles having an olivine structure were used in which 0.1% by weight of carbon microparticles (average particle diameter: 0.005 μm) were stuck to the surface thereof. The average particle diameter of primary particles of $LiFePO_4$ was 0.1 μm. To the $LiFePO_4$ particles were added vapor phase growth carbon fibers having a fiber diameter of 0.1 μm as a conductive agent in an amount of 3% by weight, graphite powder in an amount of 5% by weight and PVdF as a binder in an amount of 5% by weight based on the total weight of the positive electrode. These components were dispersed in n-methylpyrrolidone (NMP) to prepare a slurry. Then, the obtained slurry was applied to both surfaces of an aluminum alloy foil (purity: 99%) 15 μm in thickness, dried and then subjected to a pressing step to manufacture a positive electrode. In the obtained positive electrode, the density of the electrode was 2.2 g/cm$^3$, the thickness of the positive electrode layer on one surface of the current collector was 43 μm and the specific surface area of the positive electrode layer was 5 m$^2$/g.

Also, as the negative electrode active material, a lithium titanate powder was prepared which having an average primary particle diameter of 0.3 μm, a BET specific surface area of 15 m$^2$/g, a lithium ion absorption potential of 1.50 V (vs. Li/Li$^+$) and having a rhamsdelite structure and is represented by the formula $Li_2Ti_3O_7$. This negative electrode active material, a graphite power having an average particle diameter of 6 μm as an electroconductive agent and PVdF as a binder were compounded in a ratio by weight of 95:3:2. Then, the mixture was dispersed in an n-methylpyrrolidone (NMP) solvent and then stirred with ball mill at 1000 rpm for 2 hours to prepare a slurry. Then, the obtained slurry was applied to an aluminum alloy foil (purity: 99.3%) 15 μm in thickness, dried and then subjected to a heat pressing step to manufacture a negative electrode. In the obtained negative electrode, the density of the electrode was 2.2 g/cm$^3$, the thickness of the negative electrode layer on one surface of the current collector was 59 μm and the porosity of the negative electrode excluding the current collector was 35%. The BET specific surface area of the negative electrode layer (BET surface area per 1 g of the negative electrode layer) was 10 m$^2$/g.

A method of measuring particles of the negative electrode active material will be shown below.

Specifically, about 0.1 g of a sample, a surfactant, and 1 to 2 mL of a distilled water were put in a beaker, and the distilled water was sufficiently stirred, followed by pouring the stirred system in a stirring water vessel. Under this condition, the light intensity distribution was measured every 2 seconds and measured 64 times in total by using SALD-300, which is a Laser Diffraction Particle Size Analyzer manufactured by Shimadzu Corporation, to analyze the particle diameter distribution data.

The BET specific surface areas of the negative electrode active material and negative electrode were measured using $N_2$ adsorption in the following condition.

When the BET specific surface area of the negative electrode active material was measured, 1 g of a powdery negative electrode active material was used as a sample. When the BET specific surface area of the negative electrode was measured, on the other hand, two pieces of negative electrode 2×2 cm$^2$ in size were cut off as samples. As the BET specific surface area measuring apparatus, one manufacture by Yuasa Ionics Inc. was used and in this case, nitrogen gas was used as the adsorbing gas.

The porosity of the negative electrode was calculated on the basis of the difference in volume between the negative electrode layer that was tested and the negative electrode layer at the time when the porosity was 0%. In this calculation, the difference noted above was regarded as the pore volume. Incidentally, where the negative electrode layers were formed on both surfaces of the current collector, the volume of the negative electrode layer used for the calculation noted above represents the sum of the volumes of the negative electrode layers on both surfaces of the current collector.

On the other hand, a 30-μm-thick nonwoven fabric made from regenerated cellulose fibers using pulp as starting material and having an average fiber diameter of 0.3 μm was prepared as a separator. The separator was made to be in contact with the positive electrode and to cover the positive electrode and the negative electrode was made to face the positive electrode with the separator disposed therebetween. Then, these members were coiled spirally. The obtained coiled body was subjected to a high-temperature and high pressure press operated at 120° C. under a pressure of 25 kg/cm$^2$ to form a flat-shaped electrode group. The electrode width (Lp) of the positive electrode layer at this time was 50 mm, the electrode width (Ln) of the negative electrode layer at this time was 51 mm, and therefore, Lp/Ln was 0.98. The ratio (Sp/Sn) of the area of the positive electrode layer to the area of the negative electrode layer was 0.98. The porosity, position of a peak of pore diameter distribution and pore specific surface area before and after the separator was pressed are shown in Table 1.

Moreover, this electrode group was received in a thin type metallic can made from an aluminum alloy (Al purity: 99%) 0.5 mm in thickness.

In the meantime, a solvent in which propylene carbonate (PC), γ-butyrolactone (BL) and ethylene carbonate (EC) were mixed in a ratio by volume of 30:40:30 was prepared as an organic solvent. 2.0 mol/L of lithium tetrafluoroborate ($LiBF_4$) as lithium salt was dissolved in this organic solvent to prepare a liquid organic electrolyte (nonaqueous electrolytic solution). The boiling point of the obtained organic electrolyte was 220° C. This organic electrolyte was injected into the electrode group in the container to manufacture a rectangular-type nonaqueous electrolyte secondary battery having a thickness of 16 mm, a width of 40 mm and a height of 60 mm and having the structure shown in FIG. 1.

Examples 2 to 10 and Comparative Examples 1 to 5

Thin type secondary batteries were manufactured in the same manner as in the above Example 1 except that the separator, positive electrode active material, negative electrode active material, organic solvent or organic electrolyte, press temperature and press pressure as shown in Table 1 below were used.

With regard to the obtained secondary batteries, the discharge capacity of each battery was measured when the battery was charged at 25° C. under a constant current of 6 A to 2.8V for 6 minutes and then, discharged to 1.5V under a current of 3 A. Also, the secondary battery was fully charged up to peak voltage where it was in 100% charged state at 25° C. and then, stored at 70° C. for 3 months to measure the residual capacity and recovery capacity of the battery at 25° C., thereby finding the high-temperature storage performance of the battery. Moreover, after the secondary battery was charged until the charge ratio became 50%, it was made to output at 25° C. for 10 seconds to measure a maximum output as the output performance at 25° C. Also, after the secondary battery was charged until the charge ratio became 50%, it was made to output at −30° C. for 10 seconds to measure a maximum output as the output performance at −30° C.

Also, only the separator used in each secondary battery was dried at 80° C. for 24 hours and stored in the atmosphere of a temperature of 25° C. and a humidity of 20% for 5 hours, to measure the amount of water in the separator. The measurement of the amount of water was made using a Karl-Fisher moisture content measuring device in such low-humidity conditions that the dew point was −40° C. or less.

The results of measurement are shown in Table 3.

TABLE 1

| | | Before high-pressure pressing | | | After high-pressure pressing | | |
|---|---|---|---|---|---|---|---|
| | Material | Porosity (%) | Pore diameter peak position | Pore specific surface area ($m^2/g$) | Porosity (%) | Pore diameter peak position | Pore specific surface area ($m^2/g$) |
| Example 1 | Cellulose | 70 | 1 µm, 12 µm | 16 | 65 | 1 µm, 9 µm | 12 |
| Example 2 | Cellulose | 70 | 1 µm, 12 µm | 16 | 65 | 1 µm, 9 µm | 12 |
| Example 3 | Cellulose | 70 | 1 µm, 12 µm | 16 | 65 | 1 µm, 9 µm | 12 |
| Example 4 | Cellulose | 70 | 1 µm, 12 µm | 16 | 65 | 1 µm, 9 µm | 12 |
| Example 5 | Cellulose | 70 | 1 µm, 12 µm | 16 | 65 | 1 µm, 9 µm | 12 |
| Example 6 | Cellulose | 70 | 1 µm, 12 µm | 16 | 65 | 1 µm, 9 µm | 12 |
| Example 7 | Cellulose | 60 | 0.3 µm, 8 µm | 20 | 55 | 0.2 µm, 5 µm | 15 |
| Example 8 | Cellulose | 75 | 1 µm, 20 µm | 20 | 80 | 1.8 µm, 15 µm | 5 |
| Example 9 | Cellulose | 75 | 1 µm, 18 µm | 20 | 70 | 1.8 µm, 12 µm | 10 |
| Example 10 | Cellulose | 70 | 1 µm, 12 µm | 16 | 65 | 1 µm, 9 µm | 12 |
| Comparative Example 1 | Polyethylene film | 42 | 0.2 µm | 52 | 40 | 0.2 µm | 50 |
| Comparative Example 2 | Polyethylene film | 42 | 0.2 µm | 52 | 40 | 0.2 µm | 50 |
| Comparative Example 3 | Polypropylene | 47 | 0.2 µm | 62 | 45 | 0.2 µm | 60 |
| Comparative Example 4 | Cellulose | 47 | 0.2 µm, 2 µm | 22 | 45 | 0.3 µm, 2 µm | 20 |
| Comparative Example 5 | Cellulose | 90 | 5 µm, 20 µm | 62 | 82 | 5 µm, 32 µm | 40 |

TABLE 2

| | Press temperature (° C.) | Press pressure ($kg/cm^2$) | Positive electrode active material | Negative electrode active material | Negative electrode active material, lithium ion absorption potential (vs. $Li/Li^+$) | Organic solvent or organic electrolyte |
|---|---|---|---|---|---|---|
| Example 1 | 120 | 25 | $LiFePO_4$ | $Li_2Ti_3O_7$ | 1.50 V | EC/GBL/PC |
| Example 2 | 120 | 25 | $LiFePO_4$ | $Li_4Ti_5O_{12}$ | 1.55 V | EC/GBL/PC |
| Example 3 | 120 | 25 | $LiCoO_2$ | $Li_4Ti_5O_{12}$ | 1.55 V | EC/GBL/PC |
| Example 4 | 120 | 25 | $LiFePO_4$ | $TiO_2$ (B) | 1.50 V | EC/GBL/PC |
| Example 5 | 120 | 25 | $LiNi_{1/3}Mn_{1/3}Co_{1/3}O_2$ | $Li_4Ti_5O_{12}$ | 1.55 V | EC/GBL/PC |
| Example 6 | 120 | 25 | LiFePO4 | $Li_4Ti_5O_{12}$ | 1.55 V | $MEI^+/BF_4^-$ (Ionic liquid) |
| Example 7 | 150 | 25 | $LiFePO_4$ | $Li_4Ti_5O_{12}$ | 1.55 V | EC/GBL/PC |
| Example 8 | 150 | 25 | $LiFePO_4$ | $Li_4Ti_5O_{12}$ | 1.55 V | EC/GBL/PC |
| Example 9 | 100 | 25 | $LiFePO_4$ | $Li_4Ti_5O_{12}$ | 1.55 V | EC/GBL/PC |
| Example 10 | 120 | 25 | $LiMn_2O_4$ | $Li_4Ti_5O_{12}$ | 1.55 V | EC/PC (1:2) |
| Comparative Example 1 | 80 | 10 | $LiCoO_2$ | Graphite | 0.2 V | EC/GBL/PC |
| Comparative Example 2 | 80 | 10 | $LiFePO_4$ | $Li_4Ti_5O_{12}$ | 1.55 V | EC/GBL/PC |
| Comparative Example 3 | 100 | 25 | $LiNi_{1/3}Mn_{1/3}Co_{1/3}O_2$ | Graphite | 0.2 V | EC/GBL/PC |
| Comparative Example 4 | 120 | 25 | $LiFePO_4$ | $Li_4Ti_5O_{12}$ | 1.55 V | EC/GBL/PC |
| Comparative Example 5 | 120 | 1 | $LiFePO_4$ | $Li_4Ti_5O_{12}$ | 1.55 V | EC/GBL/PC |

TABLE 3

|  | Separator, water content (ppm) | 25° C. discharge capacity (mAh) | 70° C. storage three-month residual capacity rate (%) | 70° C. storage three-month recovery capacity rate (%) | Output at 25° C. (W) | Low-temperature output at −30° C. (W) |
|---|---|---|---|---|---|---|
| Example 1 | 500 | 3300 | 70 | 90 | 100 | 15 |
| Example 2 | 500 | 3300 | 70 | 90 | 150 | 18 |
| Example 3 | 500 | 3300 | 65 | 85 | 250 | 30 |
| Example 4 | 500 | 3300 | 70 | 90 | 150 | 15 |
| Example 5 | 500 | 3300 | 73 | 92 | 190 | 19 |
| Example 6 | 500 | 3300 | 73 | 92 | 100 | 5 |
| Example 7 | 700 | 3500 | 75 | 90 | 150 | 10 |
| Example 8 | 300 | 3300 | 60 | 80 | 160 | 20 |
| Example 9 | 400 | 3100 | 72 | 90 | 150 | 10 |
| Example 10 | 500 | 3100 | 70 | 60 | 200 | 5 |
| Comparative Example 1 | 10 | 3500 | 10 | 20 | 120 | 10 |
| Comparative Example 2 | 10 | 3300 | 50 | 60 | 50 | 5 |
| Comparative Example 3 | 20 | 3300 | 20 | 30 | 40 | 4 |
| Comparative Example 4 | 1000 | 3300 | 70 | 70 | 40 | 5 |
| Comparative Example 5 | 2000 | 3300 | 30 | 70 | 80 | 10 |

As is clear from Tables 1 to 3, the batteries of Examples 1 to 10 are superior to Comparative Examples 1 to 5 in the residual capacity ratio and recovery capacity after stored at 70° C., that is, life performance at 70° C. and output performance at 25° C. and −30° C.

On the other hand, in Comparative Examples 1 to 3 using a polyolefin separator having the characteristics that no second peak was present in the pore diameter distribution, the porosity was less than 55% and pore specific surface area exceeded 15 $m^2/g$, each of Comparative Examples was inferior in either the storage performance at 70° C. or output performance. Also, in Comparative Example 4 using a cellulose separator having a porosity of less than 55% and a pore specific surface area exceeding 15 $m^2/g$, the battery was inferior in output performance at 25° C. On the other hand, in Comparative Example 5 using a cellulose separator having the characteristics that no first peak was present in the pore diameter distribution, the porosity exceeding 80% and a pore specific surface area exceeding 15 $m^2/g$, the residual capacity ratio and output performance at 25° C. were low.

Also, as to the content of water in the separator, the content of water was more increased in the separators of Comparative Examples 4 and 5 than in the separators of Examples 1 to 10, and it was therefore confirmed that the use of the separator which easily adsorbs moisture brings about a deterioration in the performance of the battery.

Figure 4:
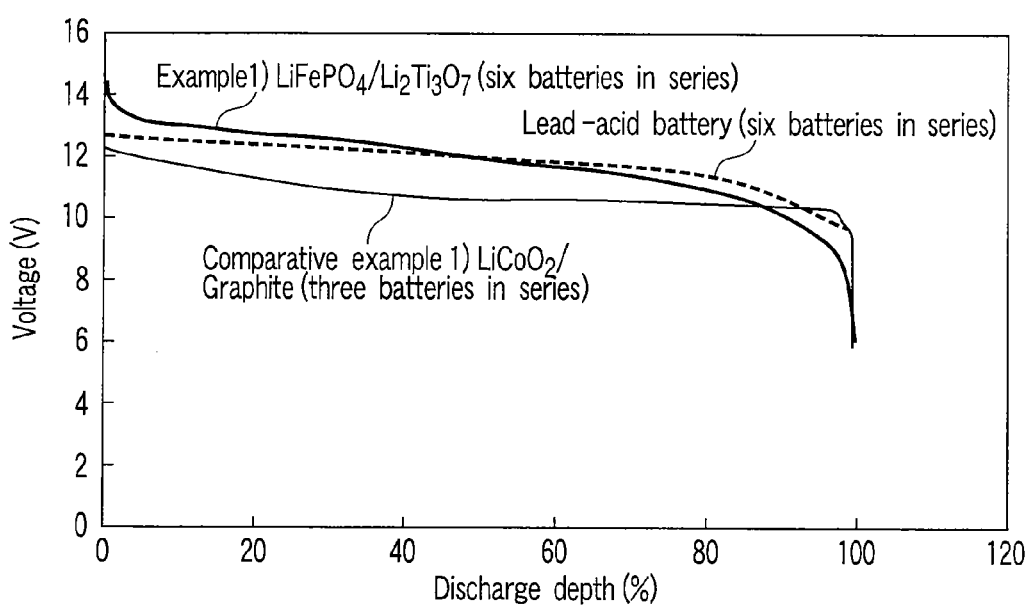
FIG. 4 is a characteristic graph showing a discharge curve of a battery pack of Example 1, a battery pack of Comparative Example 1 and a battery pack of lead-acid battery.

Moreover, six secondary batteries of Example 1 were connected in series to constitute a battery assembly, thereby obtaining a battery pack of Example 1. Also, three secondary batteries of Comparative Example 1 were connected in series to constitute a battery assembly, thereby obtaining a battery pack of Comparative Example 1. FIG. 4 is a discharge curve in 0.1 C discharge. The discharge curve of the battery pack of Example 1 was similar to the discharge curve of a 12V type lead-acid battery pack and it was therefore confirmed that the battery pack of Example 1 was superior in exchangeability for a lead-acid battery.

Also, the battery pack of Example 1 was subjected to a storage test carried out at 70° C. for 3 months in the same condition as above. As a result, the residual capacity and recovery capacity were 70% and 88% respectively. Also, the battery pack was exchanged for a lead-acid battery pack placed in the engine compartment of a car having a displacement of 1500 cc to make an engine starting test and as a result, the engine could be started in conditions ranging from winter at an external temperature of about −10° C. to summer at an external temperature of about 35° C.

With regard to the separator, the porosity, the peak position in the pore diameter distribution and pore specific surface area were found from the pore diameter distribution measured by the mercury porosimetry. The method of measuring the pore diameter distribution will be explained.

The pore diameter distribution of the separator before the high-temperature and high-pressure pressing, that is, before the separator was incorporated into the battery was measured in the following manner. Specifically, the separator was cut into a size of 25×75 mm and the obtained sample was set to Automatic Porosimeter Auto pore IV9500 (trade name, manufactured by Shimazu) to measure the pore diameter distribution at 25° C. by the mercury porosimetry.

The pore diameter distribution of the separator after the high-temperature and high-pressure pressing, that is, after the separator was incorporated into the battery was measured in the following manner. Specifically, the battery was decomposed in such low-humidity conditions that the dew point was −40° C. or less, to take out the separator, which was then cut into a size of 25×75 mm. The obtained sample was sufficiently washed by dimethyl carbonate to dissolve the nonaqueous electrolyte stuck to the sample in dimethyl carbonate and then dried under vacuum at 80° C. for 12 hours to remove the nonaqueous electrolyte completely. This sample was set to Automatic Porosimeter Auto pore IV9500 (trade name, manufactured by Shimazu) to measure the pore diameter distribution at 25° C. by the mercury porosimetry.

Figure 5:
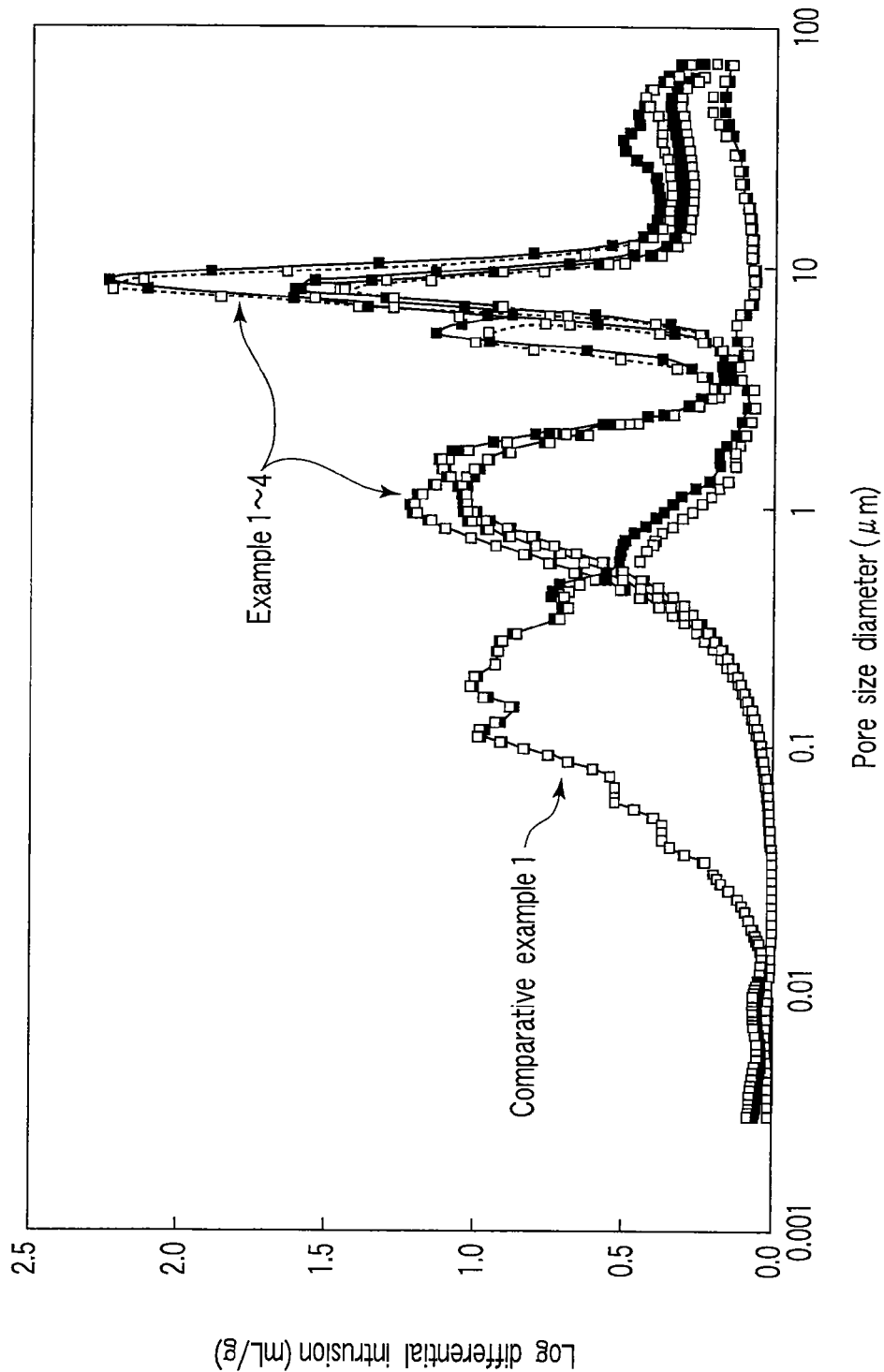
FIG. 5 is a characteristic graph showing the distribution of pore diameter of each separator used in Examples 1 to 4 and Comparative Example 1 when the pore diameter is measured by mercury porosimetry.

With regard to the separators to be used in Examples 1, 2, 3 and 4 and Comparative Example 1, the pore diameter distribution after the high-temperature and high-pressure pressing is shown in FIG. 5. In FIG. 5, the abscissa is the pore size diameter and the ordinate is the log differential intrusion. As shown in FIG. 5, the separators of Examples 1 to 4 each have a first peak in a pore diameter range of 0.2 μm to less than 2 μm and a second peak in a pore diameter range of 2 μm to 30 μm. On the contrary, the separator of Comparative Example 1 has no second peak in the pore diameter distribution.

The lithium ion absorption potential of the negative electrode active material was measured by the method explained below.

The negative electrode was cut into a size of 1 cm×1 cm as a working electrode. The working electrode was made to face a counter electrode made of a 2 cm×2 cm lithium metal foil with a glass filter separator interposed therebetween and a lithium metal was inserted as a reference electrode in such a manner that it was not to be in contact with both the working electrode and the counter electrode. These electrodes were placed in a three-pole glass cell and the working electrode, counter electrode and reference electrode were respectively connected to a terminal of the glass cell. EC and BL were mixed in a ratio by volume of 25:75 and 2 mol/l of $LiBF_4$ was dissolved in the obtained mixture solvent to prepare an electrolytic solution. 50 mL of this electrolytic solution was poured into the glass cell to allow the separator and electrode to be sufficiently impregnated with the electrolytic solution and then, the glass cell was closed. The manufactured glass cell was placed in a 25° C. constant temperature bath to measure the lithium ion absorption potential of the working electrode when charged under a current density of 0.1 $mA/cm^2$. The intermediate potential of the measured absorption potentials was found as the lithium ion absorption potential.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A secondary battery comprising:
   a positive electrode, which comprises at least one selected from the group consisting of a manganese composite oxide having a spinel structure and a metal-phosphorous oxide having an olivine structure;
   a negative electrode containing a metal compound having a lithium ion absorption potential of 0.2V vs. Li/Li$^+$ or more;
   a separator having pores provided between the positive electrode and the negative electrode; and
   a nonaqueous electrolyte;
   wherein
   the separator consists of cellulose fibers,
   a specific surface area of the pores of the separator is from 5 to 15 $m^2/g$,
   a porosity of the separator is from 55 to 80%, and
   a pore diameter distribution of the pores of the separator is at least bimodal, wherein a first peak is in a pore diameter range of 0.2 μm (inclusive) to 2 μm (exclusive) and a second peak is in a pore diameter range of 2 to 30 μm.

2. The secondary battery according to claim 1, wherein the positive electrode comprises the manganese composite oxide and the manganese composite oxide comprises $Li_aMn_2O_4$, wherein $0 \le a \le 1$.

3. The secondary battery according to claim 1, wherein the positive electrode comprises the metal-phosphorous oxide and the metal-phosphorous oxide comprises at least one selected from the group consisting of $Li_aFePO_4$ and $Li_aFe_{1-c}Mn_cPO_4$ wherein $0 \le a \le 1.1$ and $0 \le c \le 1$.

4. The secondary battery according to claim 1, wherein the metal compound of the negative electrode is $Li_xTiO_2$ wherein $0 \le x \le 1$ or a lithium-titanium oxide having a spinel or rhamsdelite structure.

5. The secondary battery according to claim 1, wherein the specific surface area is 10 to 14 $m^2/g$.

6. The secondary battery according to claim 1, wherein the first peak is present at a pore diameter range of 0.3 μm (inclusive) to 2 μm (exclusive) and the second peak is present at a pore diameter of 3 to 20 μm.

7. The secondary battery according to claim 1, wherein the porosity is 62 to 80%.

8. A car comprising the secondary battery according to claim 1.

9. The secondary battery according to claim 1, wherein the positive electrode comprises $Li_aMn_2O_4$ wherein $0 \le a \le 1$ and $Li_aFe_{1-c}Mn_cPO_4$ wherein $0 \le a \le 1.1$ and $0 \le c \le 1$.

10. A battery pack which comprises a secondary battery, the secondary battery comprising:
    a positive electrode, which comprises at least one selected from the group consisting of a manganese composite oxide having a spinel structure and a metal-phosphorous oxide having an olivine structure;
    a negative electrode containing a metal compound having a lithium ion absorption potential of 0.2V (vs. Li/Li$^+$) or more;
    a separator having pores provided between the positive electrode and the negative electrode; and
    a nonaqueous electrolyte;
    wherein
    the separator consists of cellulose fibers,
    a specific surface area of the pores of the separator is from 5 to 15 $m^2/g$,
    a porosity of the separator is from 55 to 80%, and
    a pore diameter distribution of the pores of the separator is at least bimodal, wherein a first peak is in a pore diameter range of 0.2 μm (inclusive) to 2 μm (exclusive) and a second peak is in a pore diameter range of 2 to 30 μm.

11. The battery pack according to claim 10, wherein the positive electrode comprises the manganese composite oxide and the manganese composite oxide comprises $Li_aMn_2O_4$, wherein $0 \le a \le 1$.

12. The battery pack according to claim 10, wherein the positive electrode comprises the metal-phosphorous oxide and the metal-phosphorous oxide comprises at least one selected from the group consisting of $Li_aFePO_4$ and $Li_aFe_{1-c}Mn_cPO_4$ wherein $0 \le a \le 1.1$ and $0 \le c \le 1$.

13. The battery pack according to claim 10, wherein the metal compound of the negative electrode is $Li_xTiO_2$ wherein $0 \le x \le 1$ or a lithium-titanium oxide having a spinel or rhamsdelite structure.

14. The battery pack according to claim 10, wherein the specific surface area is 10 to 14 $m^2/g$.

15. The battery pack according to claim 10, wherein the first peak is present at a pore diameter range of 0.3 μm (inclusive) to 2 μm (exclusive) and the second peak is present at a pore diameter of 3 to 20 μm.

16. The secondary battery according to claim 10, wherein the porosity is 62 to 80%.

17. The secondary pack according to claim 10, wherein the secondary battery is present in plural, the battery pack comprising a battery assembly comprising the plural batteries connected in series.

18. The battery pack according to claim 10, wherein the positive electrode comprises $Li_aMn_2O_4$ wherein $0 \le a \le 1$ and $Li_aFe_{1-c}Mn_cPO_4$ wherein $0 \le a \le 1.1$ and $0 \le c \le 1$.

* * * * *